(12) United States Patent
Cutler

(10) Patent No.: US 9,071,895 B2
(45) Date of Patent: *Jun. 30, 2015

(54) SATELLITE MICROPHONES FOR IMPROVED SPEAKER DETECTION AND ZOOM

(71) Applicant: Microsoft Corporation, Redmond, WA (US)

(72) Inventor: Ross G. Cutler, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/681,075

(22) Filed: Nov. 19, 2012

(65) Prior Publication Data

US 2013/0093831 A1 Apr. 18, 2013

Related U.S. Application Data

(62) Division of application No. 12/190,585, filed on Aug. 12, 2008, now Pat. No. 8,314,829.

(51) Int. Cl.
*H04N 7/15* (2006.01)
*H04R 3/00* (2006.01)
(Continued)

(52) U.S. Cl.
CPC .............. *H04R 3/005* (2013.01); *H04N 7/142* (2013.01); *H04R 1/406* (2013.01); *H04R 5/027* (2013.01); *H04R 2420/07* (2013.01); *H04N 7/18* (2013.01)

(58) Field of Classification Search
CPC ......... H04N 7/15; H04N 7/142; H04N 7/147; H04N 7/152; H04N 5/23238; H04N 13/0022; H04N 5/2628; H04N 7/141; H04R 3/005; H04R 1/406; H04R 2201/401; H04R 2430/20; H04R 2201/403; H04R 2420/07; H04R 29/005; H04M 3/567; H04M 3/568; H04M 2203/509

USPC ........................................... 348/14.01–14.16
See application file for complete search history.

(56) References Cited

U.S. PATENT DOCUMENTS 3,118,340 A 1/1964 Iwerks et al.
5,404,397 A 4/1995 Janse et al.
(Continued)

FOREIGN PATENT DOCUMENTS

JP 08-125835 A 5/1996
JP 1996-125835 5/1996

OTHER PUBLICATIONS

Zhang et al. "Boosting-based Multimodal Speaker Detection for Distributed Meetings," 2006, 8th Workshop on Multimedia Signal Processing, IEEE.
(Continued)

*Primary Examiner* — Stella Woo
(74) *Attorney, Agent, or Firm* — Andrew Smith; Jim Ross; Micky Minhas

(57) ABSTRACT

Architecture for exploiting satellite microphones and employing other techniques of conference room camera/microphone systems to significantly improve the true positive rate (reduce false positives) in sound source localization (SSL). Techniques for realizing the improvement include using an LED emitter to determine the precise location of the satellite microphones on a table, using the base SSL and external sounds to determine the approximate location of the satellite microphone on the table, using the satellite microphone phase to improve the SSL performance, using the satellite microphone amplitude to improve the active speaker detector (ASD) performance, and using the satellite microphones to estimate camera zoom.

18 Claims, 14 Drawing Sheets

(51) Int. Cl.
*H04N 7/14* (2006.01)
*H04N 7/18* (2006.01)
*H04R 1/40* (2006.01)
*H04R 5/027* (2006.01)

(56) References Cited

U.S. PATENT DOCUMENTS

| | | | |
|---|---|---|---|
| 5,999,630 | A | 12/1999 | Iwamatsu |
| 6,005,610 | A * | 12/1999 | Pingali ............... 348/169 |
| 6,469,732 | B1 * | 10/2002 | Chang et al. ........... 348/14.08 |
| 6,593,956 | B1 * | 7/2003 | Potts et al. ............ 348/14.09 |
| 7,020,337 | B2 | 3/2006 | Viola et al. |
| 7,031,499 | B2 | 4/2006 | Viola et al. |
| 7,039,199 | B2 | 5/2006 | Rui |
| 7,099,510 | B2 | 8/2006 | Jones et al. |
| 7,197,186 | B2 | 3/2007 | Jones et al. |
| 7,212,651 | B2 | 5/2007 | Viola et al. |
| 7,586,513 | B2 | 9/2009 | Muren et al. |
| 7,613,313 | B2 * | 11/2009 | Juppi et al. ............ 381/306 |
| 8,314,829 | B2 * | 11/2012 | Cutler ................. 348/14.01 |
| 2002/0140804 | A1 | 10/2002 | Colmenarez et al. |
| 2003/0160862 | A1 * | 8/2003 | Charlier et al. ........... 348/14.08 |
| 2003/0184645 | A1 * | 10/2003 | Biegelsen et al. ........... 348/14.1 |
| 2004/0001137 | A1 | 1/2004 | Cutler et al. |
| 2004/0267521 | A1 | 12/2004 | Cutler et al. |
| 2005/0246167 | A1 | 11/2005 | Nakajima et al. |
| 2008/0037802 | A1 * | 2/2008 | Posa et al. ............... 381/77 |
| 2008/0143819 | A1 | 6/2008 | Rodman et al. |
| 2008/0170717 | A1 | 7/2008 | Liu et al. |

OTHER PUBLICATIONS

Rui et al., "Sound Source Localization for Circular Arrays of directional Microphones," 2005, vol. 3, IEEE International Conference on Acoustics, Speech, and Signal Processing.

"Round Table" 2007, Microsoft Corporation.

Yokoe et al., "Audio-based Estimation fo Speakers Directions for Multimedia Meeting Logs," 2007, IEEE International Conference on Multimedia and Expo.

U.S. Official Action dated Feb. 24, 2012 in U.S. Appl. No. 12/190,585.

U.S. Notice of Allowance dated Jul. 16, 2012 in U.S. Appl. No. 12/190,585.

* cited by examiner

SATELLITE MICROPHONES FOR IMPROVED SPEAKER DETECTION AND ZOOM

CROSS REFERENCE TO RELATED APPLICATIONS

This application is a division of co-pending U.S. application Ser. No. 12/190,585 filed Aug. 12, 2008 entitled "Satellite Microphones for Improved Speaker Detection and Zoom," which is expressly incorporated herein by reference.

BACKGROUND

The Internet facilitates a more dispersed business environment by allowing employees, vendors, and customers to communicate and conduct business via e-mail and/or audio (telephone conferencing) techniques. However, such information exchange mechanisms lack the benefit of the more personal face-to-face contact that can provide a more effective and productive environment.

Existing video conferencing systems provide a limited view of a participant's work environment and are even less effective when the meeting requires drawings or sketching on a whiteboard, for example. Panoramic camera systems for wide-angle viewing can be utilized to record and broadcast meetings by recording not only the video images of the meeting environment, but also by providing a microphone array for recording audio input so out-of-location viewers can see and hear meeting interactions.

The camera/microphone base system is typically positioned on a table surrounded (to some extent) by the meeting participants to provide adequate input to the microphone system for speaker detection. Microphone arrays can be employed with technology to estimate the sound source localization (SSL) of a conference room table. However, SSL often generates false positives due to reflections in the room. In one analysis, about half of the false positives point to the wrong half-plane of the table.

The base microphone array cannot accurately estimate the distance of the speaker from the base system due to the short baseline. Additional microphones are required to accurately estimate the distance. Conventional solutions for approximating range include adding a microphone to the camera and use the satellite microphone, with limited success.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes methods for exploiting sensors associated with a conferencing sensing system (e.g., images, microphones) of a conference room to significantly improve the true positive rate (reduce false positives) in sound source localization (SSL). Techniques for realizing the improvement include using an LED emitter to determine the precise location of satellite microphones on a table relative to the centralized conference sensing system, using the base SSL and external sounds to determine the approximate location of the satellite microphones on the table, using a satellite microphone phase to improve the SSL performance, using a satellite microphone audio amplitude to improve the active speaker detector (ASD) performance, and using the satellite microphones to estimate camera zoom.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
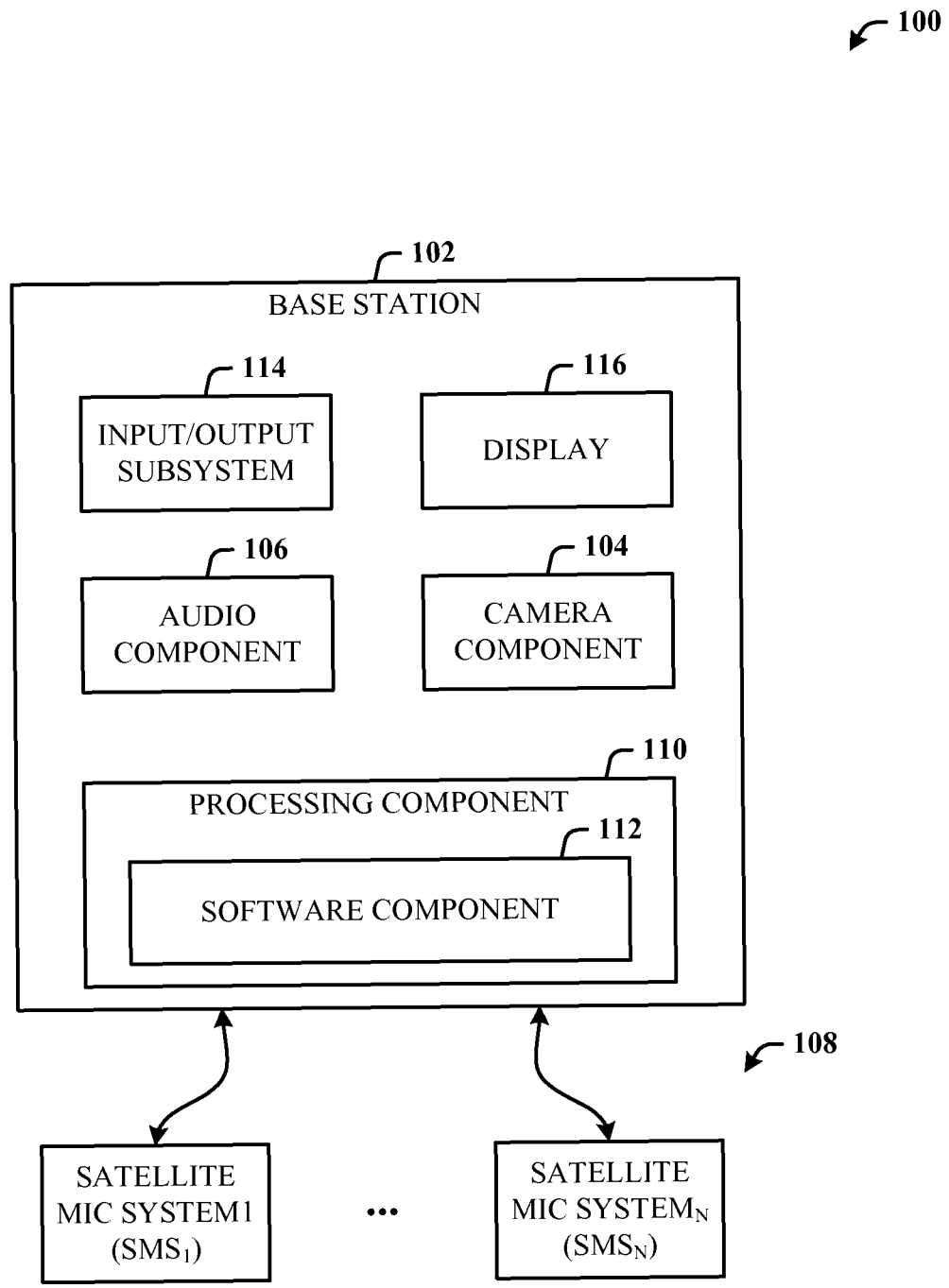
FIG. 1 illustrates a conferencing system for automatic speaker detection.

The disclosed conferencing architecture employs satellite microphone systems separately or in combination with a conferencing base station audio/video systems to improve sound source localization (SSL) for enhanced speaker detection. Phase and amplitude measurements can also further enhance zoom capabilities of a panoramic camera mounted as part of the conferencing base station. The satellite microphone systems can be uniquely identified by the camera system as part of locating the satellite microphone systems, and using this information to improve SSL and active speaker detector (ASD) performance.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a conferencing system 100 for automatic speaker detection. The system 100 includes a conferencing base station 102 that typically is situated at the approximate center of a conference room table. The base station 102 includes a camera component 104 that includes a camera system (e.g., panoramic) for capturing session participant images (and videos) and other conference room features such a white boards, documents, etc. In other words, the camera component 104 facilitates the communication of video signals for the conferencing session.

The bases station 102 also includes an audio component 106 for communicating audio signals of the conferencing session. The audio component 106 includes a local speaker subsystem for outputting audio signals at the base station and a local microphone array subsystem for receiving voice signals, for example, of the session participants.

The system 100 also includes one or more satellite microphone systems 108 (denoted $SMS_1, \ldots, SMS_N$) remotely located from and coupled to the base station 102 for communicating audio signals of session participants to the base station audio component 106.

The base station 102 can also include a processing component 110 that includes software and hardware (e.g., digital signal processing units, etc.) for processing onboard signals of the base station 102. A software component 112 of the processing component 110 can include applications and algorithms, for example, for automatically detecting a session speaker of the session participants using an active speaker detector (ASD) based in part on the one or more satellite microphones. The ASD operates in combination with the camera component 104 to provide high-resolution video of an active speaker in the session by tracking the audio source (e.g., switching between session speakers). The software component 112 can include algorithms such as neural nets (for learning and training), filters, applications for user interaction, etc., for processing dynamic changes in audio and video signals and sources.

The base station 102 can also include an input/output subsystem 114 for receiving user input via a soft keypad for dialing telephone numbers or entering other information (e.g., IP network information), connecting to IP networks (e.g., wire/wireless connectivity), connecting the satellite systems 108 to the base station 102, and other devices or systems, for example. A display 116 facilitates the presentation of information via the base station 102 to session participants such as caller ID, echoing user input via the soft keypad, text, and other multimedia content, for example.

In a more specific description, the conferencing system 100 comprises the conferencing base station 102 having a local microphone array (as part of the audio component 106) for receiving audio signals from participants of a conferencing session, an elevated camera of the base station 102 for capturing images associated with the session, multiple satellite microphones 108 distributed about and coupled to the base station 102 for receiving and communicating the audio signals of the participants to the base station 102, and a processing component 110 of the base station 102 for automatically detecting a speaker based in part on location of the satellite microphones 108.

As will be described in greater detail herein, the processing component 110 computes SSL information based on the audio signals of the local microphone array and the satellite microphones 108, and inputs the SSL information into an active speaker detector (ASD) for detection of the speaker.

The processing component 110 also computes an estimated location of the satellite microphones 108 based on vertical field of view, height of the camera from a table surface, and horizontal angles of the satellite microphones relative to the base station 102.

The processing component 110 is also employed to process the amplitude of the audio signals of the satellite microphones 108 and/or phase information between the local microphone array and the satellite microphones 108 for detection of the speaker.

In an alternative utilization, the processing component 110 computes zoom settings for the camera based on the amplitude of the audio signals of the satellite microphones 108 and/or phase information between the local microphone array and the satellite microphones 108 for detection of the speaker.

Figure 2:
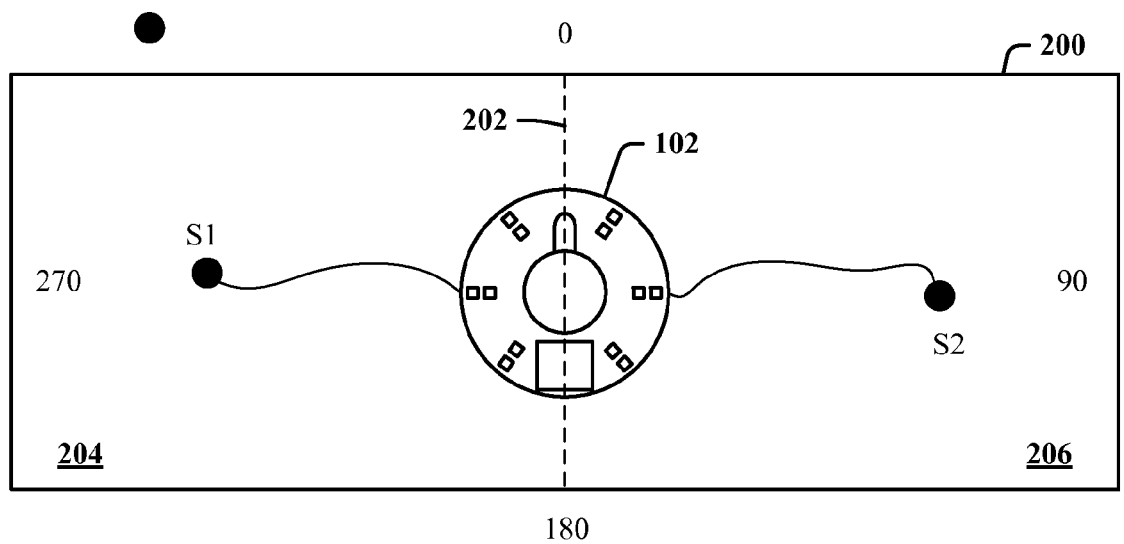
FIG. 2 illustrates utilization of the system of FIG. 1 on a conference room table for audio/video processing.

FIG. 2 illustrates utilization of the system 100 of FIG. 1 on a conference room table 200 for audio/video processing. The base station 102 is positioned on an imaginary line 202 that divides the table 200 into two half-planes (204 and 206). Here, two satellite microphone systems (S1 and S2) are used: system S1 located in the first half-plane 204 and system S2 located in the other half-plane 206. The half-planes (204 and 206) defined by the position and orientation of the base station 102 can be modeled as the table region in the angle of (180, 360] for the first half-plane 204 and as the table region in the angle of [0,180) for the other half-plane 206. The base station 102 processes can then determine the locations of the satellite microphone systems (S1 and S2) relative to the half-planes and the base station 102, itself, using techniques described herein to provide more effective SSL and ASD for a sound source wherever that may be around the table 200.

At least two estimation methods (denoted "precise" and "approximate") can be employed to improve the ASD/SSL performance by estimating the locations of the satellite microphone systems with respect to the base station.

Figure 3:
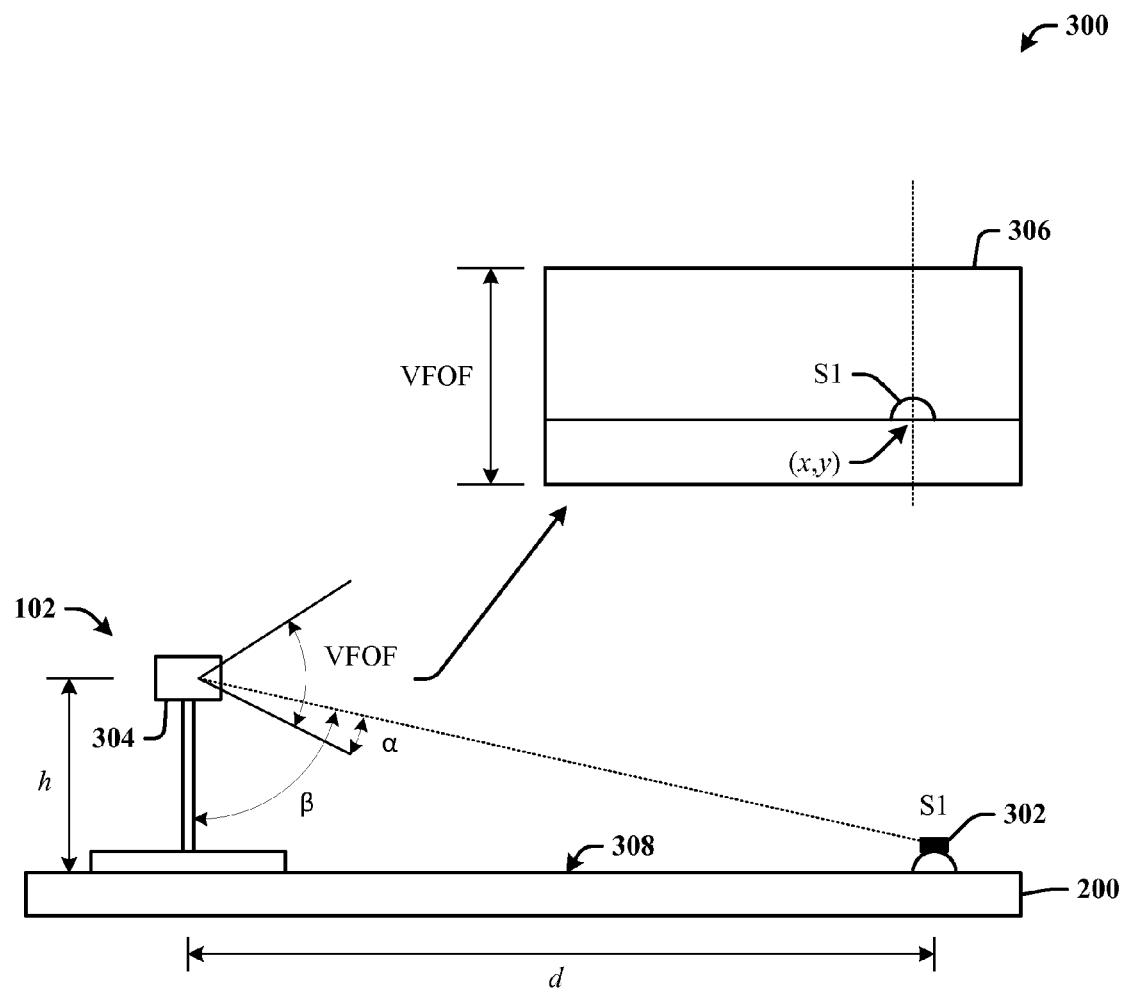
FIG. 3 illustrates a diagram for precise method for computing location of a satellite microphone system.

FIG. 3 illustrates a diagram 300 for precise method for computing location of a satellite microphone system (S1). The precise method involves utilization of an emitter 302 on each of the satellite microphone systems for uniquely identifying each of the satellite microphone systems and dimension parameters for computing location of the satellite systems.

For example, the emitter 302 can be an infrared (IR) emitter that is added to the satellite microphone system S1 such that signals emitted from the emitter 302 can be captured by a camera subsystem 304 of the base station 102. The IR emitter wavelength is selected to be close to the camera's IR cutoff filter (e.g., 650 nm); therefore, the IR emitter is visible to the camera sensing system, but not visible to humans.

Where the camera 304 is capable of a panoramic view, the location of the satellite microphone(s) in a panoramic image 306 can be estimated based on the known geometry of the camera's vertical field of view (VFOV) and camera head height h from the surface 308 of the table 200. Specifically, an angle α can be estimated from a coordinate (x,y) in the image 306 associated with the satellite microphone system S1. The coordinate (x,y) can be computed based on an image recognition algorithm as part of the software component 112 of FIG. 1.

For example, a vertical angle α can be estimated as $$\alpha = \frac{VFOV}{2} - \tan^{-1}\left(\frac{y_{max} - y}{\frac{y_{max}/2}{\tan\frac{VFOV}{2}}}\right).$$

A vertical angle β can be estimated by β=90−VFOV$_{horizon}$+α, where VFOV$_{horizon}$ is the portion of the VFOV below the horizon. A distance d from the base station 102 to the satellite microphone S1 can be computed as d=h/tan (90−β).

Figure 4:
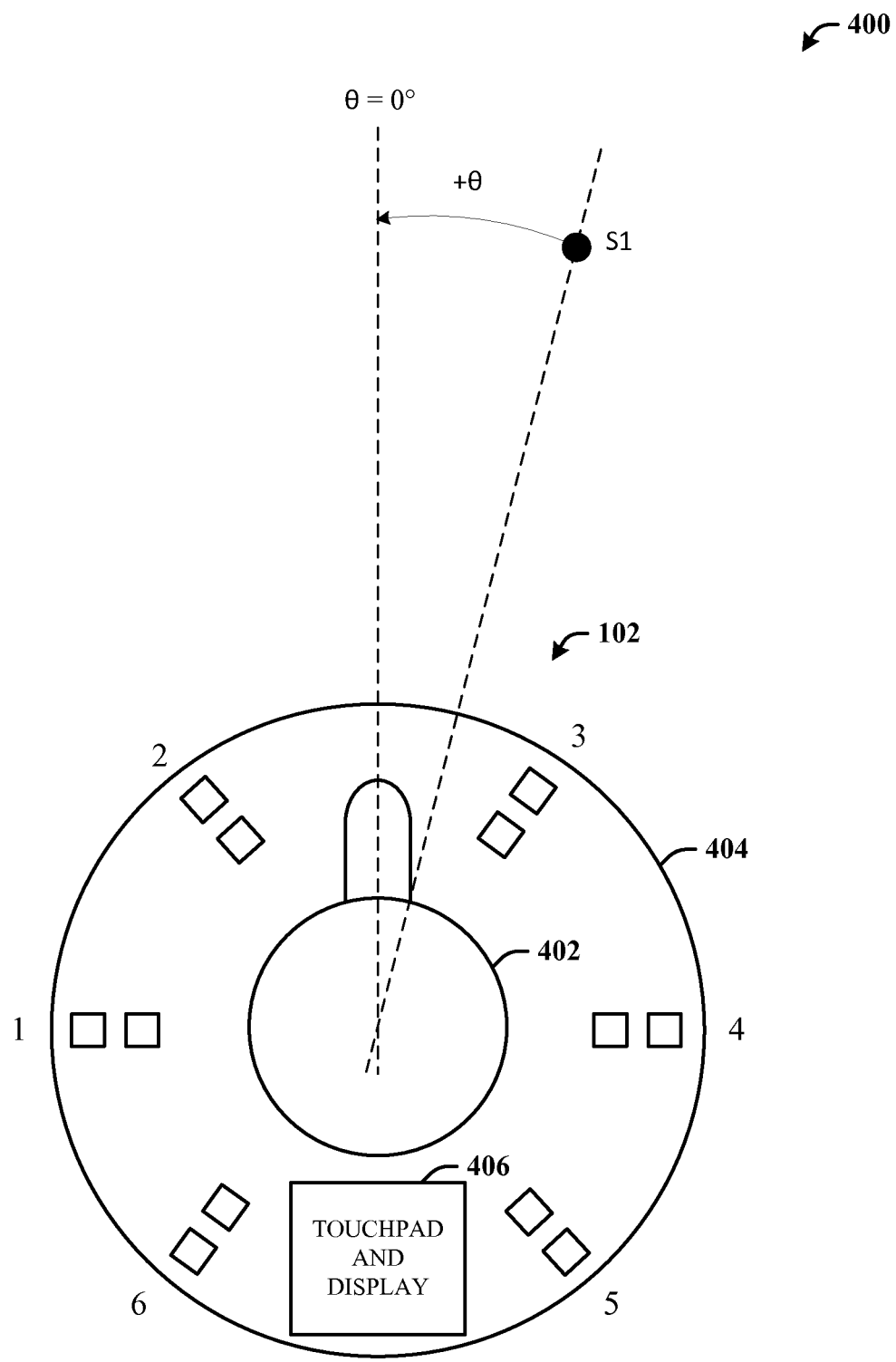
FIG. 4 illustrates a top-down view of an exemplary base station.

FIG. 4 illustrates a top-down view 400 of an exemplary base station 102. The base station 102 includes a camera subsystem 402 elevated above a base subsystem 404. The base subsystem 404 includes a local microphone array of, in this example, six local microphones systems associated with numerals 1-6. The base subsystem 404 also includes a soft keypad and display subsystem 406 for user input and interaction. A horizontal angle θ, depicted in FIG. 4, can be estimated from the image coordinate x as θ=(360*x)/x$_{max}$ of the captured image 306 of FIG. 3.

Figure 5:
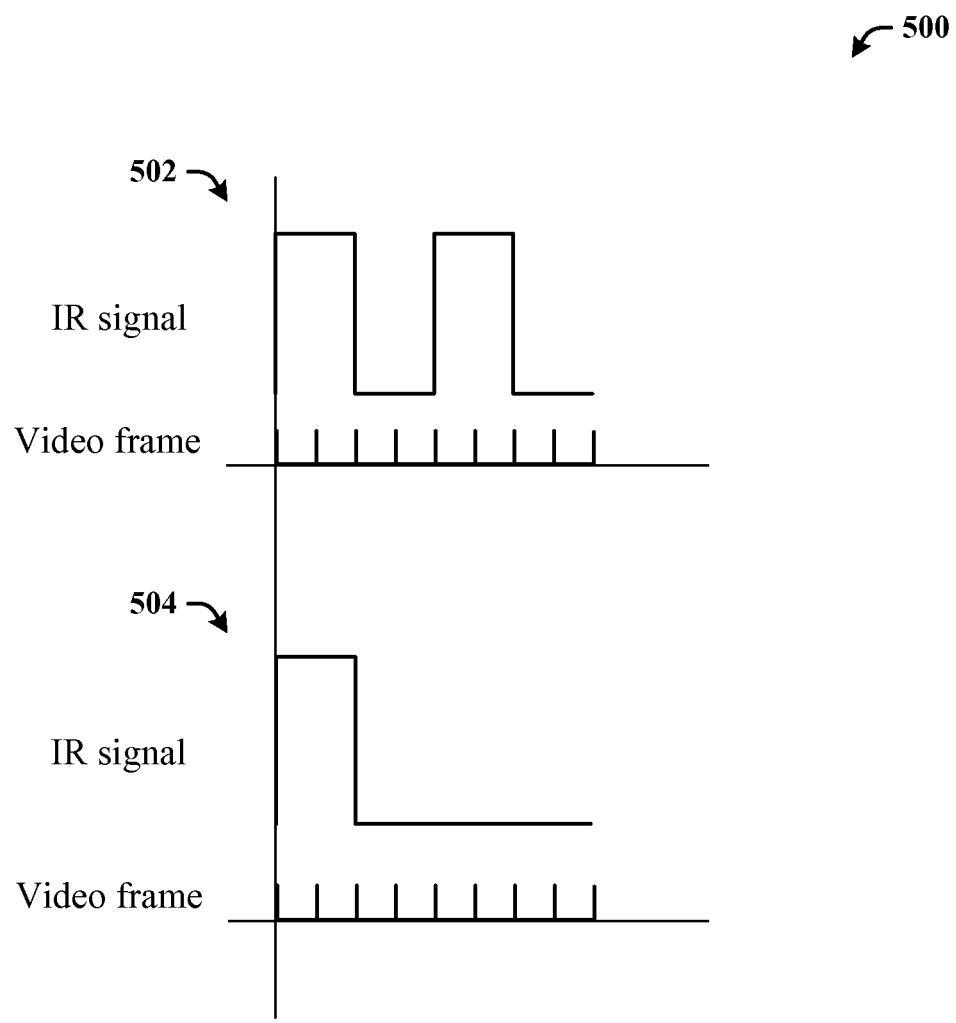
FIG. 5 illustrates emitter signals that can be employed for uniquely identifying satellite microphone systems.

FIG. 5 illustrates emitter signals 500 that can be employed for uniquely identifying satellite microphone systems. Here, two signals 500 are shown for a corresponding pair of the satellite microphone systems, for example, S1 and S2 of FIG. 2. An IR signal 502 can be generated to drive the IR emitter (e.g., emitter 302 of FIG. 3) for the satellite microphone system S1 and an IR signal 504 can be generated to drive the IR emitter for the satellite microphone system S2. The signals (502 and 504) can be captured and detected using image processing, and thus, be employed for differentiating satellite microphones among multiple such satellite microphones using image differences.

Figure 6:
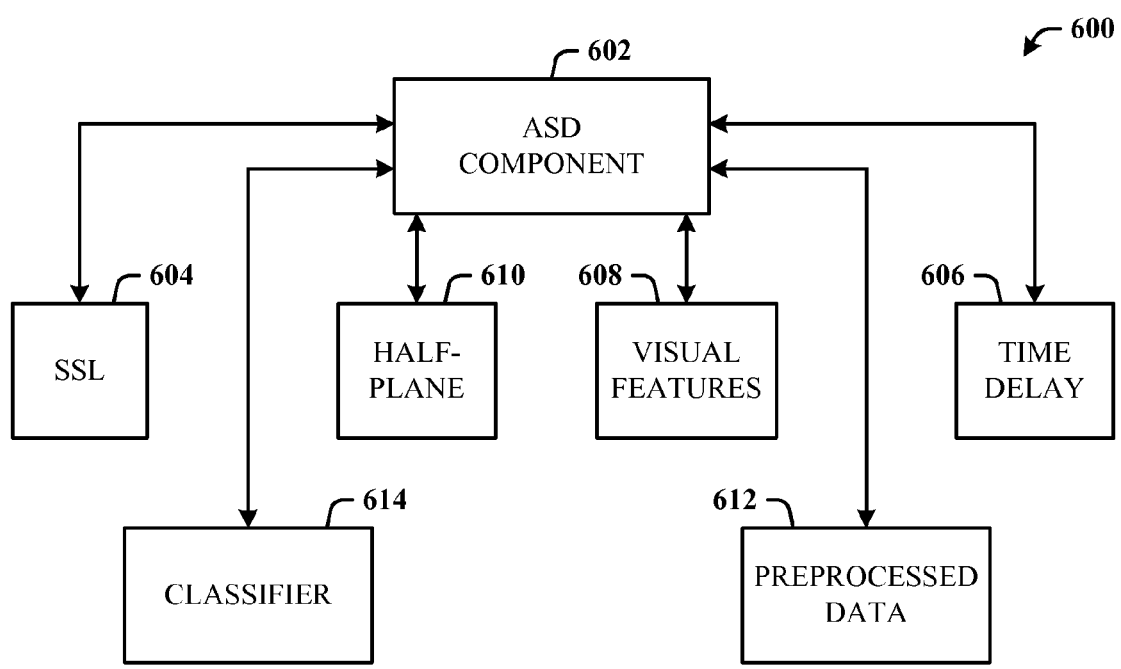
FIG. 6 illustrates ASD data inputs that can be employed for improved ASD performance as part of the software component of FIG. 1 when employing satellite microphone systems.

FIG. 6 illustrates ASD data inputs 600 that can be employed for improved ASD performance as part of the software component 112 of FIG. 1 when employing satellite microphone systems. An ASD component 602 can now receive and utilize improved SSL information 604, time delay data 606, visual features 608 (e.g., emitter signals, image recognition, etc.), half-plane data 610, preprocessed data 612, and classifier data 614. The preprocessed data 612 can include data stored on the base station and/or retrieved from remote data sources disposed on a network on which the base station can function as a node. It is also within contemplation of the instant architecture that voice recognition can be employed separately or in combination with image or video recognition to further improve ASD. In other words, once the system has processed a sufficient amount of data, the system can hypothesize the identity of participants and the location of the participants relative to the base station and/or satellite microphone systems. Follow-up processing can continue to further bolster a system choice as to identity or to cause the base station system to refine an identity computation of a participant based on checks made periodically throughout the session.

Referring again to FIG. 2, following is an approximate satellite microphone estimation method for improved SSL and ASD processing. The approximate method estimates the half-plane in which a satellite microphone system is located without utilization of an emitter (e.g., IR) associated with each satellite microphone system. The approximation estimate method is performed as follows based on audio power received by the respective satellite microphone in the half-planes (204 and 206):

If SSL θ∈[0,180)
If RMS(S1)<<RMS(S2) then S2 is in right half-plane.
If RMS(S2)<<RMS(S1) then S1 is in right half-plane.
Else if SSL θ∈[180,360)
If RMS(S1)>>RMS(S2) then S1 is in left half-plane.
If RMS(S2)>>RMS(S1) then S2 is in left half-plane.

The phase information of the satellite microphone systems can also be employed to improve the SSL performance. Given a precise location of the satellite microphone systems, an SSL algorithm can include the satellite microphone (mic) systems in the SSL estimate. Specifically, the base station can employ a generate-and-test algorithm which generates a hypothetical sound source location and direction, and computes the likelihood of the hypothetical location being the actual location of the speaker given the phase estimates and microphone array geometry. This likelihood estimation is computed for all directions. In one implementation, the base station assumes that the satellite mic location is about one a meter away. Then, a probability distribution function is derived based on the likelihood that the sound is coming from each one of the directions hypothesized (e.g., all directions within steps of four degrees). In one instance, this is performed for the six base station microphones. The satellite microphones (mics) are then added into the algorithm for an 8-mic solution (including S1 and S2). If other satellite microphones are employed, the solution is adjusted accordingly.

A principal difference between the satellite microphones and the base station (or local) microphones as far as the SSL algorithm is concerned is that the location of the satellite microphones is less accurate than the base microphones (e.g., within approximately 100 mm for the satellite mic locations versus 1 mm for the base station mics). The satellite microphones extend the base station microphone array to a much wider baseline. Thus, range and elevation can now be included in the hypothesis for location generation.

Additionally, the satellite microphone amplitude can be used to improve the ASD performance. Given the approximate location of the satellite microphone (e.g., which half-plane is the mic in) and the RMS (root mean square) of the satellite microphone the ASD can exhibit improved accuracy. Specifically, the half-plane locations and RMS values of satellite microphone systems S1 and S2 of FIG. 2 are fed into the ASD component 602 of FIG. 6, and used as features for the ASD component 602 during training. The ASD will automatically determine the appropriate weighting of these new features to improve the ASD performance. An alternative set of Boolean mutually exclusive features can be the following, (assuming the S1 and S2 locations in FIG. 2) are:

speaker_in_left_half_plane=RMS(S1)>>RMS(S2)
speaker_in_right_half_plane=RMS(S1)<<RMS(S2)

The satellite microphone systems can also be employed to estimate zoom. In a first implementation, audio signal amplitude from each of the satellite mics is processed as part of providing range estimation for the zoom function. Given precise satellite microphone location, the range estimation given in the 8-microphone SSL algorithm previously described can be used to determine zoom, for example, use 1.5× zoom if the range>1.5 m; else use a 1.0× zoom. However, with no satellite microphone location information, a binary zoom can determined using the relative amplitude of the satellite and base station microphones. More specifically:

If RMS(S1)>>RMS(base) or RMS(S2)>>RMS(base)
zoom 1.5×
Else
zoom 1.0×

The inequality threshold can be set to >3 dB. The threshold can also be implemented as part of microphone selection (e.g., the microphone with maximum signal-to-noise ratio (SNR)). More specifically:

If satellite microphone selected
Zoom 1.5×
Else
Zoom 1.0×

In this latter example, the satellite microphones are positioned relatively closely to predetermined nominal position (e.g., centered in half-plane of table). Additionally, it may be desired to calibrate the satellite microphone amplitudes approximately 1 dB accuracy, which can be done at the manufacturer or by the installer.

Figure 7:
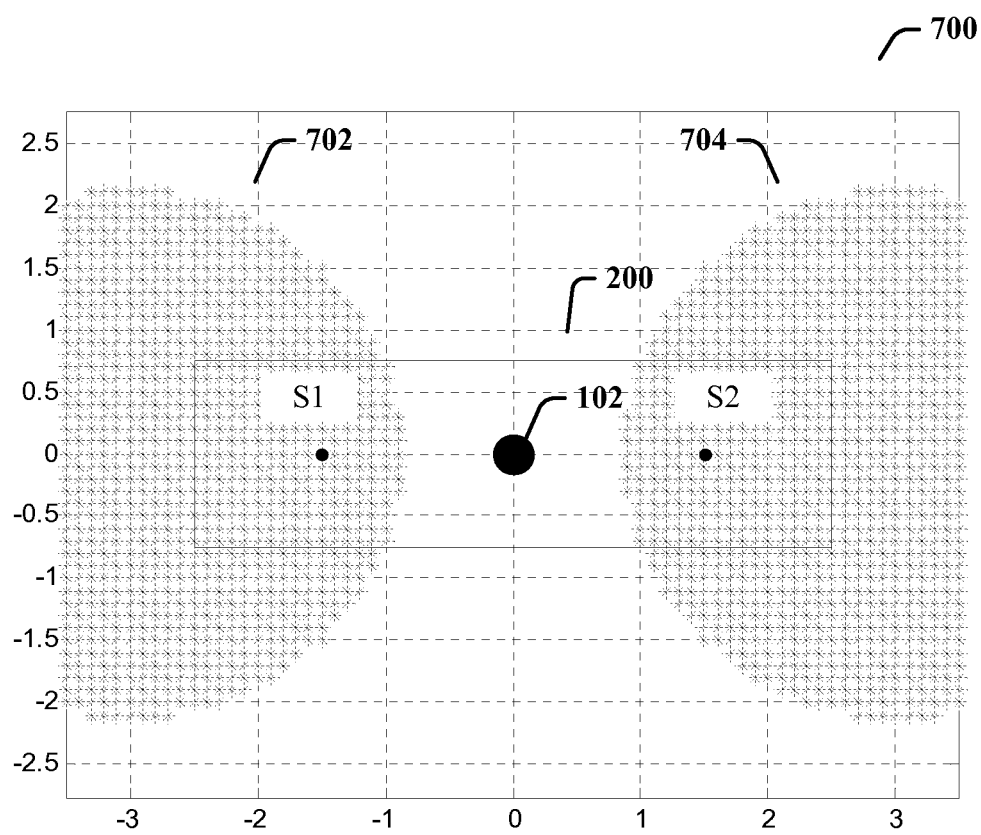
FIG. 7 illustrates the utilization of satellite microphone amplitude to estimate camera zoom.

FIG. 7 illustrates the utilization of satellite microphone amplitude to estimate camera zoom. The graph 700 is superimposed on the table 200 (e.g., 16 ft.×5 ft.) having the base station 102 and satellite microphones systems (S1 and S2) positioned similar to FIG. 2. The zoom setting for the camera of the base station 102 is set to 1.5× in the regions 702 and 704 of the corresponding half-planes.

Figure 8:
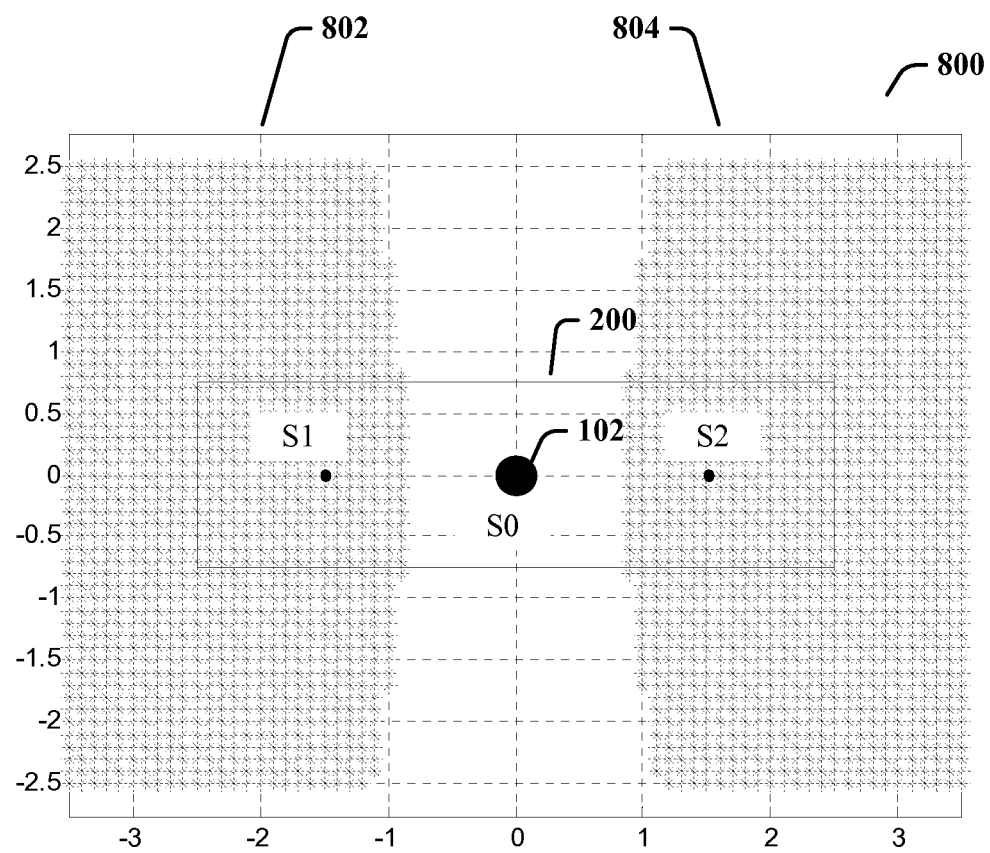
FIG. 8 illustrates the utilization of satellite microphone phase to estimate camera zoom.

FIG. 8 illustrates the utilization of satellite microphone phase to estimate camera zoom. The graph 800 is superimposed on the table 200 (e.g., 16 ft.×5 ft.) having the base station 102 and satellite microphones systems (S1 and S2) positioned similar to FIG. 2. This method estimates the distance from the base station 102 to the satellite microphones (S1 and S2), and uses the microphone phase to determine whether to zoom. This implementation has the advantage that microphone amplitude calibration is not utilized.

More specifically, the time delay td measures this value between the satellite microphone (e.g., S1) and the base station S0, represented as td(S1,S0). If td(S1,S0)<0, then the sound arrives at the satellite mic S1 before the base station S0. A threshold $\tau$ is used to tune when to apply zoom. The algorithm is requires no manufacturer or in-room calibration. For example, If td(S1,S0)<$\tau$
Zoom 1.5×
Else
Zoom 1.0×

Figure 9:
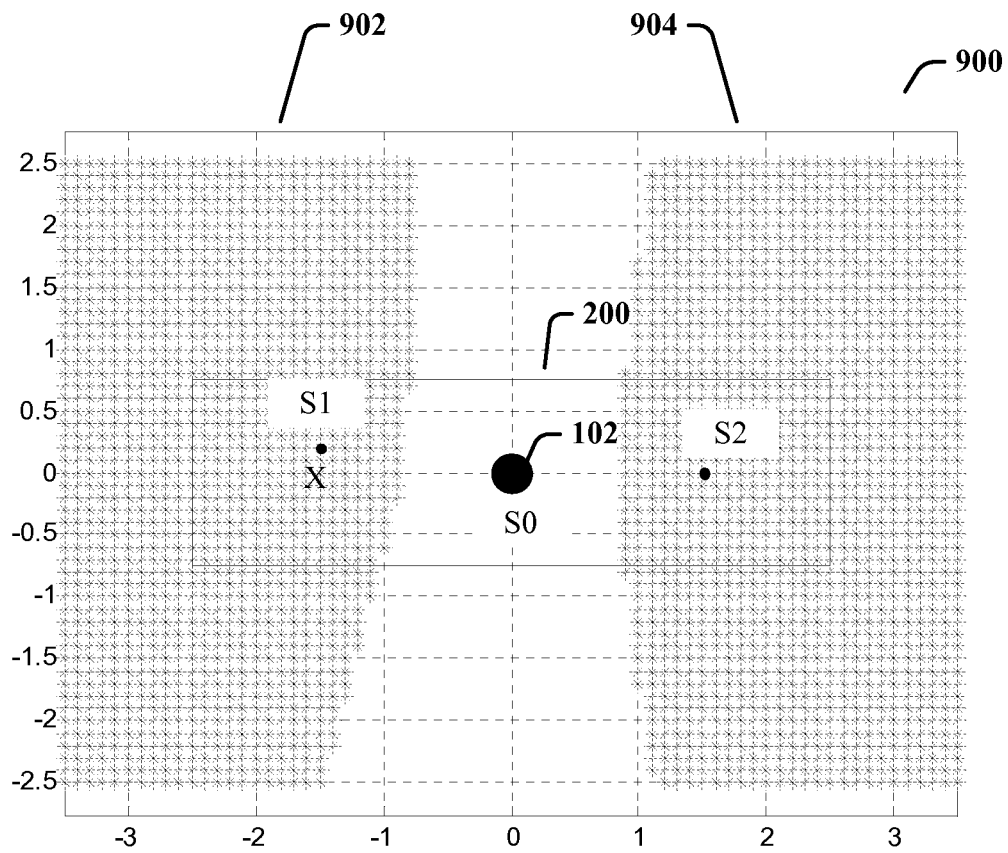
FIG. 9 illustrates the utilization of satellite microphone phase to estimate camera zoom where with a satellite microphone is off-center.

The results of this method are illustrated in FIG. 8, based on threshold $\tau$=−0.2/342 seconds. FIG. 9 illustrates the utilization of satellite microphone phase to estimate camera zoom where with a satellite microphone is off-center. The nominal position (or location) for satellite microphone S1 is marked as "X", which aligns on the horizontal line through satellite microphone S2 and the base station 102. The nominal position is the predetermined location in a half-plane where it is desired that the satellite microphone be operated. Here, the satellite microphone S1 is moved about 0.2 m off its nominal position in the left half-plane, resulting in the slightly altered zoom region 902 (when compared to the zoom region 802 of FIG. 8).

Disclosed herein is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
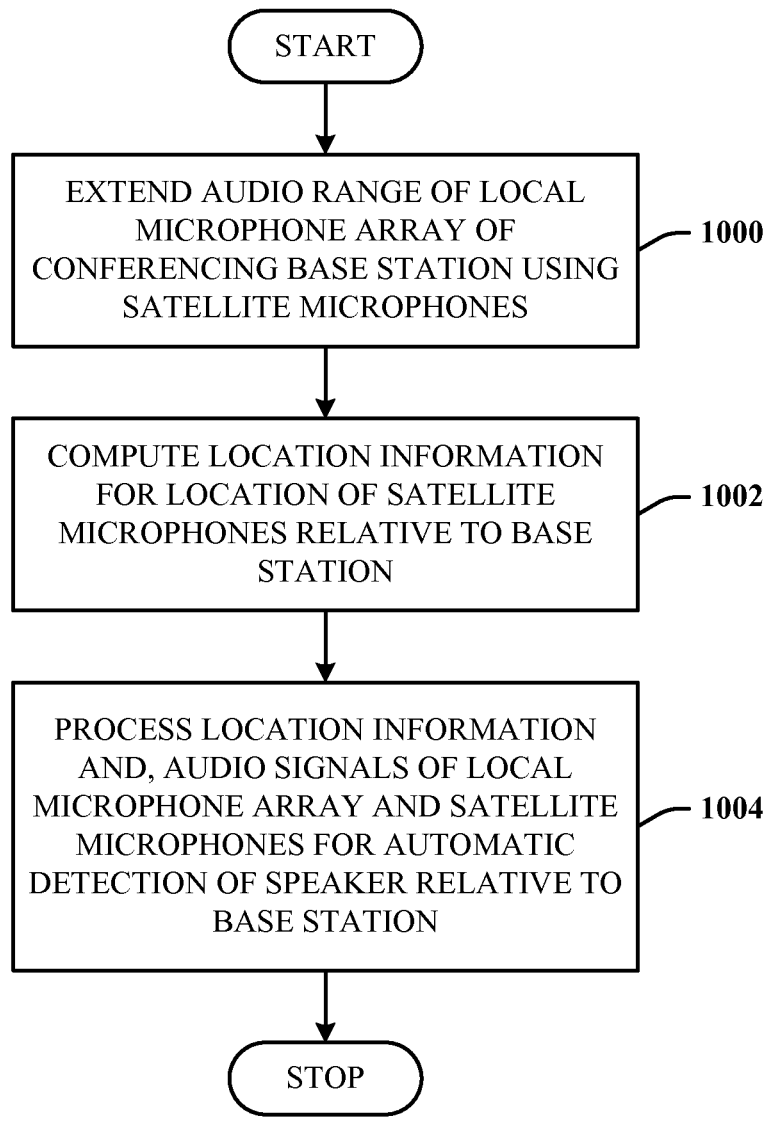
FIG. 10 illustrates a method of detecting a speaker in a conferencing session.

FIG. 10 illustrates a method of detecting a speaker in a conferencing session. At 1000, the audio range of a local microphone array of a conferencing base station is extended using satellite microphones. At 1002, location information is computed for determining the location of the satellite microphones relative to the base station. At 1004, the location information and audio signals of the local microphone array and the satellite microphones are processed for automatic detection of the speaker relative to the base station.

Figure 11:
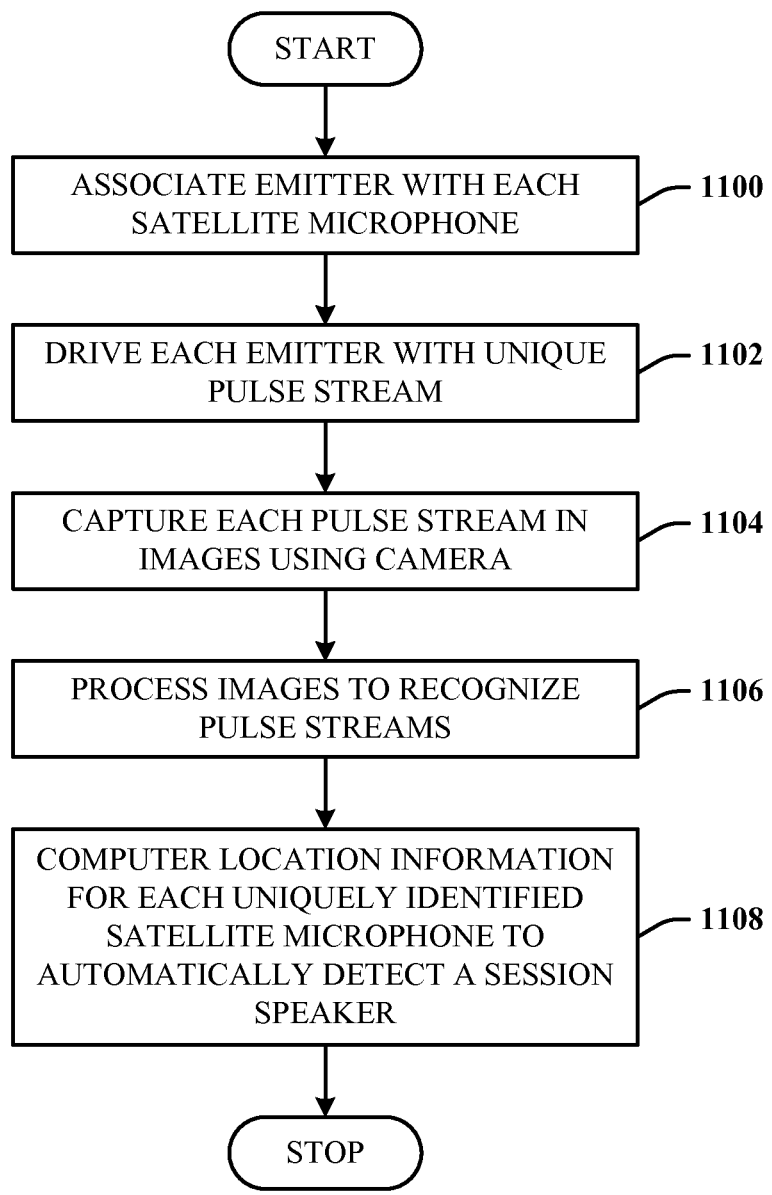
FIG. 11 illustrates a method of uniquely identifying satellite microphones of a conferencing base station.

FIG. 11 illustrates a method of uniquely identifying satellite microphones of a conferencing base station. At 1100, an emitter is associated with each of satellite microphones. At 1102, each emitter is driven using a unique pulse stream. At 1104, each pulse stream is capture in images using a camera. At 1106, the images are processed to recognize the pulse streams. At 1108, the location information for a uniquely identified satellite microphone is used for SSL to automatically detect a session speaker.

Figure 12:
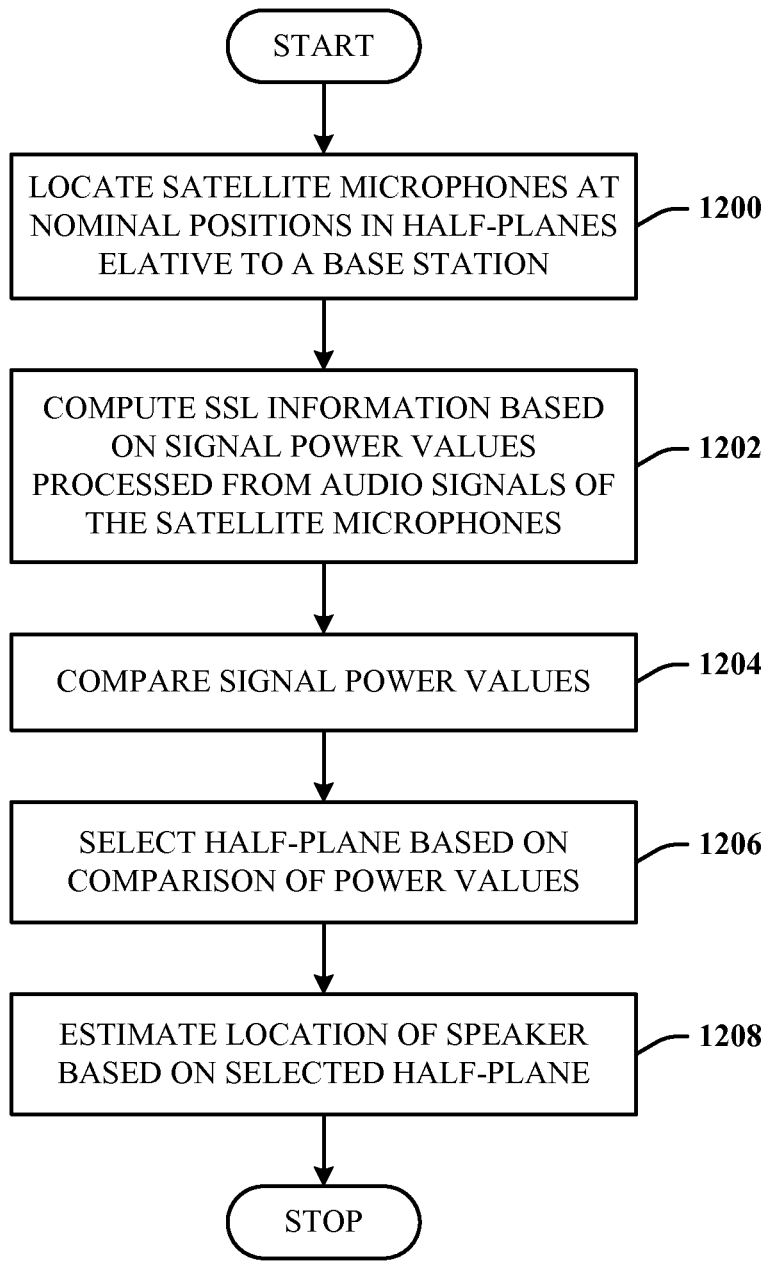
FIG. 12 illustrates a method of computing location of satellite microphones based on table half-planes.

FIG. 12 illustrates a method of computing location of satellite microphones based on table half-planes. At 1200, satellite microphones are located at nominal positions in half-planes relative to a base station. At 1202, SSL information is computed based on signal power values processed from audio signals received from the satellite microphones. At 1204, the signal power values are compared. At 1206, a half-plane is selected based on the comparison of signal power values. At 1208, the location of the speaker is estimated based on selection of the half-plane.

Figure 13:
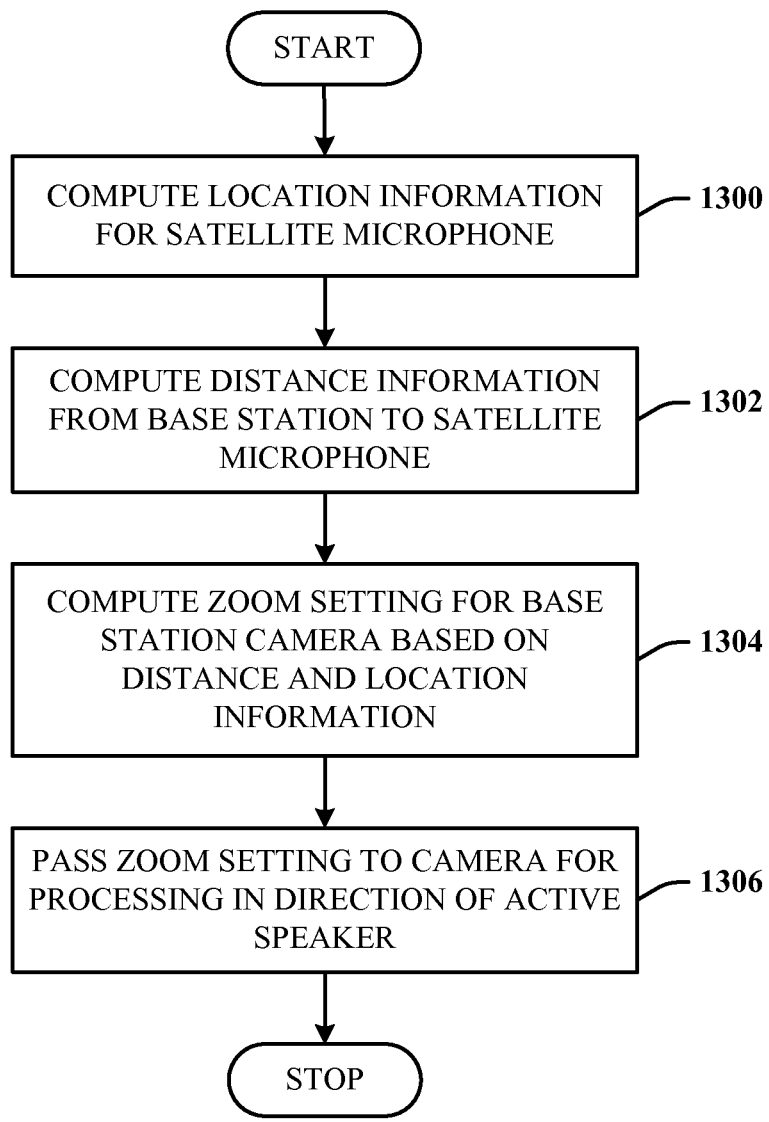
FIG. 13 illustrates a method of estimating and imposing zoom settings based on satellite microphone signals.

FIG. 13 illustrates a method of estimating and imposing zoom settings based on satellite microphone signals. At 1300, the location information for a satellite microphone is computed. At 1302, the distance (or range) information from the base station to the satellite microphone is computed. At 1304, a zoom setting for a base station camera is computed based on the distance information and the location information. At 1306, the zoom setting is passed to the camera for processing in direction of active speaker.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 14:
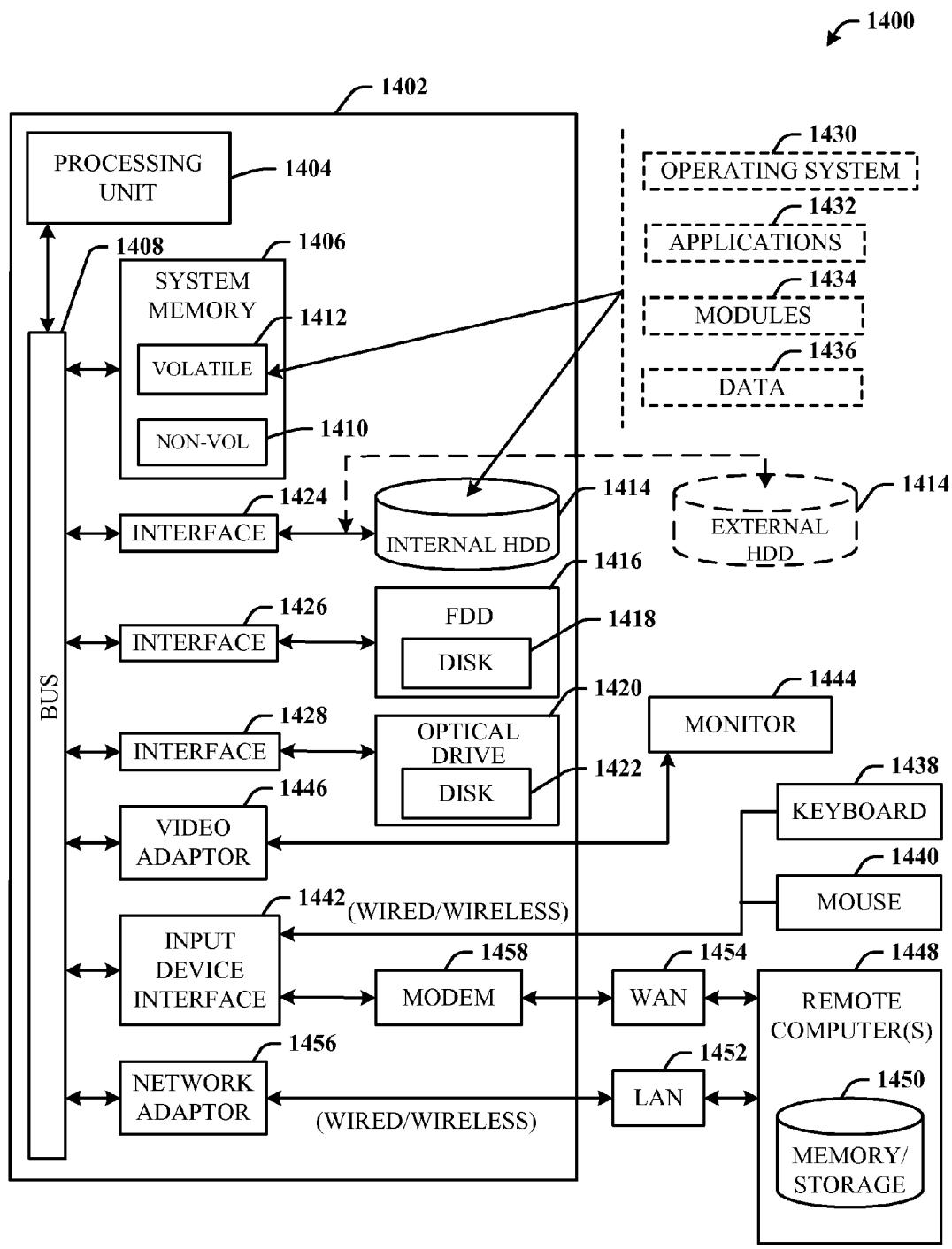
FIG. 14 illustrates a block diagram of a computing system operable to interface to the base station and compute satellite microphone location information and zoom information in accordance with the disclosed architecture.

Referring now to FIG. 14, there is illustrated a block diagram of a computing system 1400 operable to interface to the base station and compute satellite microphone location information and zoom information in accordance with the disclosed architecture. Note that only a few components described in association with the computer 1402 would be employed in the base station 102 of FIG. 1. For example, the processing unit 1404, memory 1406, etc.

In order to provide additional context for various aspects thereof, FIG. 14 and the following discussion are intended to provide a brief, general description of a suitable computing system 1400 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary computing system 1400 for implementing various aspects includes a computer 1402 having a processing unit 1404, a system memory 1406 and a system bus 1408. The system bus 1408 provides an interface for system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 can include non-volatile memory (NON-VOL) 1410 and/or volatile memory 1412 (e.g., random access memory (RAM)). A basic input/output system (BIOS) can be stored in the non-volatile memory 1410 (e.g., ROM, EPROM, EEPROM, etc.), which BIOS are the basic routines that help to transfer information between elements within the computer 1402, such as during start-up. The volatile memory 1412 can also include a high-speed RAM such as static RAM for caching data.

The computer 1402 further includes an internal hard disk drive (HDD) 1414 (e.g., EIDE, SATA), which internal HDD 1414 may also be configured for external use in a suitable chassis, a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as a DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1412, including an operating system 1430, one or more application programs 1432, other program modules 1434, and program data 1436. All or portions of the operating system, applications, modules, and/or data can also be cached in the volatile memory 1412. It is to be appreciated that the disclosed architecture can be implemented with various commercially available operating systems or combinations of operating systems.

A user can enter commands and information into the computer 1402 through one or more wire/wireless input devices, for example, a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces such as a parallel port, IEEE 1394 serial port, a game port, a USB port, an IR interface, etc.

A monitor 1444 or other type of display device is also connected to the system bus 1408 via an interface, such as a video adaptor 1446. In addition to the monitor 1444, a computer typically includes other peripheral output devices (not shown), such as speakers, printers, etc.

The computer 1402 may operate in a networked environment using logical connections via wire and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, is connected to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of detecting a speaker comprising:
   extending audio range of a local microphone array of a conferencing base station using satellite microphones;
   computing location information for location of the satellite microphones relative to the conferencing base station;
   processing the location information and audio signals of the local microphone array and the satellite microphones for automatic detection of a speaker relative to the conferencing base station; and
   estimating location distances of the satellite microphones from the conferencing base station based, at least in part, on panoramic camera images of the satellite microphones.

2. The method of claim 1, further comprising locating the satellite microphones on opposing regions of the conferencing base station according to corresponding nominal locations and estimating location of a satellite microphone relative to the regions based on audio power.

3. The method of claim 1, further comprising estimating location distances of the satellite microphones from the conferencing base station based on vertical field of view of a camera, and head height of the camera.

4. The method of claim 3, further comprising computing sound source localization (SSL) based in part on distance and elevation information for each of the satellite microphones relative to the conferencing base station.

5. The method of claim 1, further comprising processing amplitude of the audio signals of the satellite microphones and half-plane location of the satellite microphones for detection of the speaker.

6. The method of claim 1, further comprising automatically estimating and imposing a zoom setting for a video camera of the conferencing base station based on amplitude of the audio signals of the satellite microphones and local microphone array.

7. The method of claim 1, further comprising automatically estimating and imposing a binary zoom setting for a video camera of the conferencing base station based on amplitude of the audio signals of the local microphone array.

8. The method of claim 1, further comprising determining whether to exercise zoom on a video camera of the conferencing base station based on estimated distance of a satellite microphone for the conferencing base station and audio signal time delay between the satellite microphone and the local microphone array.

9. A system for detecting a speaker including:
   a conferencing base station including a local microphone array;
   a plurality of satellite microphones connected to the conferencing base station; and
   a computing device configured to
      compute location information for location of the satellite microphones relative to the conferencing base station,
      detect a speaker relative to the conferencing base station based on the location information and audio signals received from the local microphone array and the plurality of satellite microphones, and
      estimate location distances of each of the plurality of satellite microphones from the conferencing base station based, at least in part, on panoramic camera images of each of the plurality of satellite microphones.

10. The system for detecting a speaker according to claim 9, where the computing device being further configured to
    locate the plurality of satellite microphones on opposing regions of the conferencing base station according to corresponding nominal locations and
    estimate the location of a satellite microphone relative to the opposing regions based on audio power.

11. The system for detecting a speaker according to claim 9, where the computing device being further configured to estimate location distances of each of the plurality of satellite microphones from the conferencing base station based on vertical field of view of a camera, and head height of the camera.

12. The system for detecting a speaker according to claim 11, where the computing device being further configured to compute sound source localization (SSL) based in part on a distance and an elevation for each of the plurality of satellite microphones relative to the conferencing base station.

13. The system for detecting a speaker according to claim 9, where the computing device being further configured to process an amplitude of the audio signals from the plurality of satellite microphones and a half-plane location of the plurality of satellite microphones for detection of the speaker.

14. The system for detecting a speaker according to claim 9, where the computing device being further configured to estimate and impose a zoom setting for a video camera of the conferencing base station based on an amplitude of the audio signals of the plurality of satellite microphones and the local microphone array.

15. The system for detecting a speaker according to claim 9, where the computing device being further configured to estimate and impose a binary zoom setting for a video camera of the conferencing base station based on an amplitude of the audio signals of the local microphone array.

16. The system for detecting a speaker according to claim 9, where the computing device being further configured to determine whether to exercise zoom on a video camera of the conferencing base station based on an estimated distance of a satellite microphone of the plurality of satellite microphones of the conferencing base station and an audio signal time delay between the satellite microphone of the plurality of satellite microphones and the local microphone array.

17. One of an optical disk, a magnetic storage device or a non-volatile memory device having computer-executable instructions stored thereon that, when executed by a computer, cause the computer to:

estimate the location distances of each of a plurality of satellite microphones from a conferencing base station is based, at least in part, on panoramic camera images of each of a plurality of satellite microphones; and process the location distances and audio signals of a local microphone array on the conferencing base station and the plurality of satellite microphones for detection of a speaker relative to the conferencing base station.

18. The optical disk, magnetic storage device or non-volatile memory device according to claim 17, further comprising computer-executable instructions stored thereon that, when executed by the computer, further cause the computer to at least one of:

estimate the location distances of each of the plurality of satellite microphones from the conferencing base station based on vertical field of view of a camera, and head height of the camera; or compute sound source localization (SSL) based in part on a distance and an elevation for each of the plurality of satellite microphones relative to the conferencing base station.

\* \* \* \* \*